United States Patent [19]

Taylor

[11] Patent Number: 4,625,270
[45] Date of Patent: Nov. 25, 1986

[54] RFI SUPPRESSION TECHNIQUE FOR SWITCHING CIRCUITS

[75] Inventor: Robert L. Taylor, Denville, N.J.

[73] Assignee: AT&T Bell Laboratories, Murray Hill, N.J.

[21] Appl. No.: 789,392

[22] Filed: Oct. 21, 1985

[51] Int. Cl.$^4$ .............................................. H02J 1/02
[52] U.S. Cl. ....................................... 363/39; 363/20; 455/63
[58] Field of Search ...................... 363/20–21, 363/39–41, 47–48, 56, 97; 455/50, 63, 296–299

[56] References Cited

U.S. PATENT DOCUMENTS

| | | | |
|---|---|---|---|
| Re. 31,638 | 7/1984 | Lam | 375/7 |
| 3,339,082 | 8/1967 | Rhyne | 307/66 |
| 4,030,024 | 6/1977 | Chambers et al. | 363/41 |
| 4,212,053 | 7/1980 | Sichenzia | 363/39 |
| 4,335,423 | 6/1982 | Koizumi et al. | 363/21 |
| 4,377,842 | 3/1983 | Cambier | 363/20 |
| 4,439,741 | 3/1984 | Turner, Jr. | 455/63 X |

Primary Examiner—Peter S. Wong
Attorney, Agent, or Firm—Alfred G. Steinmetz

[57] ABSTRACT

A switching type power supply includes neutralizing circuitry to counteract current flow to equipment ground due to generated RF currents. This neutralizing circuitry includes an added transformer winding and a neutralizing capacitor to counteract and cancel specified leakage currents. This arrangement permits use of smaller filter capacitors and hence reduces the line frequency leakage current flow to equipment ground.

10 Claims, 5 Drawing Figures

RFI SUPPRESSION TECHNIQUE FOR SWITCHING CIRCUITS

FIELD OF THE INVENTION

This invention relates to high frequency switching circuits and in particular to the control of RFI and the suppression of RF currents, and radiated emission generated by the high frequency switching. It is particularly concerned with limiting leakage currents to ground and broadband RF currents on the access leads of a switching power supply in order to reduce or limit common mode conducted noise on input and output leads, and consequently reduce the resulting radiated emission.

BACKGROUND OF THE INVENTION

Switching power supplies are a preferred embodiment in many power processing applications because of their high efficiency and theoretical power density advantage (i.e., a small unit can theoretically process large amounts of power). Since power processing is achieved by the use of switching devices alternately transitioning between conducting and nonconducting states in an interval of time less than a microsecond, high radio frequency harmonic signals are generated. These radio frequency signals flow in a plurality of networks of circuit paths or closed circuit loops, both within and without the actual physical domains of the switching power supply. These circuit paths include the actual conductors apparent in the circuit schematic, and more significantly circuit paths connected by rapidly charging and discharging actual and parasitic capacitances within the power supply which include filter capacitors, the power transistor to heat sink capacitance, transformer winding capacitances, wiring to ground capacitances, and a host of other sources of parasitic capacitances. These circuit paths also include input and output access leads which act as antennas and radiate electromagnetic energy in response to these circulating RF currents. Not only does this radiated energy interfere with other electrical equipment, but it and the RF currents are required to be maintained below certain limits by statutory and regulatory standards such as the FCC Part 15, VDE, IEC and similar standards.

The most common technique of suppressing these RF currents and radiated emissions (RFI) is to place low pass filters on the input and output leads of the power supply in order to attenuate these currents. Since the noise is radiated into all the leads of the power supply, these filters must encompass every individual lead coming into and going out of the power supply, and must operate to attenuate both normal and common mode noise currents. These filter circuits unfortunately add considerable size and weight and expense to the overall power supply circuit package and also reduce its overall efficiency. Stated concisely, the filter circuits nullify many of the advantages for which a switching power supply was selected in the first place, and for all that, they do not provide a complete solution to the leakage current problems because the filter capacitors also conduct line frequency currents, thus introducing dangerous leakage currents into the equipment grounding wire whose magnitude may exceed limits allowed by codified safety standards such as UL, IEC, VDE, etc.

SUMMARY OF THE INVENTION

In a switching type power supply, embodying the principles of the invention, RF circulating currents, leakage currents and the resultant RFI emissions are significantly reduced by canceling generated RF noise with specially generated nullifying signals. In one particular embodiment, the RF currents are suppressed by canceling common mode conducted RFI by means of an added winding to the power transformer and of an added associated capacitance. In one specific arrangement, a primary winding of the power transformer is series connected with a canceling winding magnetically coupled to the primary winding and operative to generate a voltage to oppose RF current in the primary winding to ground through a parasitic capacitance, and prevent it from entering equipment ground and returning through the AC line and neutral mains connected to the power supply. A neutralizing capacitor is added to the circuit to directly counteract or neutralize a voltage of the parasitic capacitance and enable the RF current to be suppressed. This arrangement permits the use of smaller filter capacitors and hence drastically reduces the leakage currents that can flow to equipment ground.

BRIEF DESCRIPTION OF THE DRAWINGS

An understanding of the invention may be readily attained by reference to the following specification and the accompanying drawing in which.

DETAILED DESCRIPTION

Figure 1:
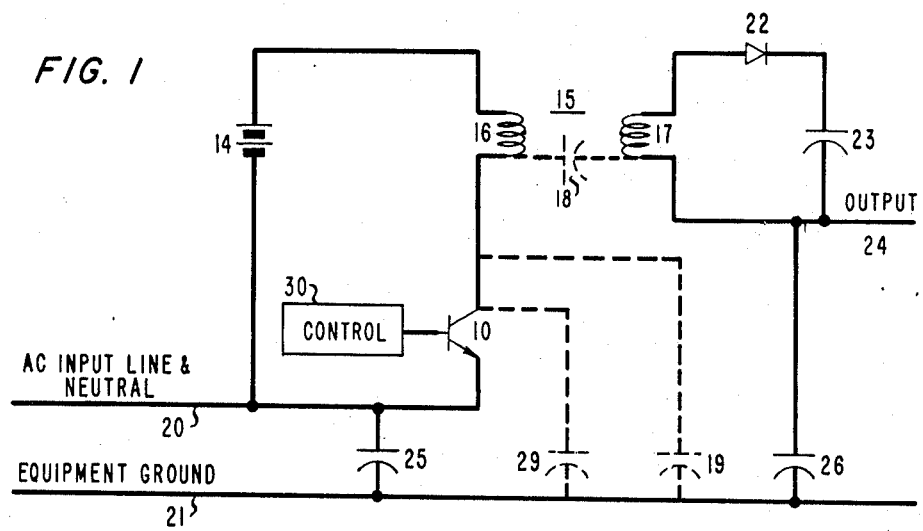
FIG. 1 is a schematic of a high frequency model of a single ended switching type power supply.

A schematic of a high frequency AC model of a single ended switching type power supply useful for considering the more prominent RFI common mode current paths is disclosed in FIG. 1. Since common mode RFI is being evaluated, the input 20 is shown symbolically as a single conductor combining the rectified input and neutral leads. The primary switching loop is an AC current path including power switch 10, primary winding 16 of power transformer 15 and battery 14 which may be considered as a low resistance AC signal path. The secondary winding 17 is connected through rectifying diode 22, and filter capacitor 23 to the output common lead 24. A control circuit 30 periodically drives power switch 10 on and off.

The major source of RF current is caused by the high frequency switching of power transistor 10 which is periodically driven by the control circuit 30. The currents generated by the large transient voltage changes due to this switching are coupled to the equipment ground 21 by currents flowing through the parasitic or stray capacitors 18 and 29, shown in dotted form in FIG. 1, and filter capacitors 26 and 25 which are also shown in FIG. 1. Parasitic or stray capacitor 18 represents the equivalent lumped stray capacitance between the primary winding 16 and secondary winding 17 of transformer 15. Parasitic capacitor 29 represents an equivalent lumped stray capacitance coupling the primary winding 16 to equipment ground 21, and as shown is paralleled with the parasitic capacitor 19 of the power switching transistor's heat sink mounting capacitance coupling its collector to equipment ground. Capacitor 25 is a filter capacitor added so that common mode RFI does not flow out the output leads. These stray and filter capacitances provide a ready conduction path for coupling the generated RF currents to equipment ground.

Filter capacitor 25 is shown coupling the input line 20 to equipment ground 21. When this capacitor is increased in value to shunt RF current from the input and equipment ground leads 20 and 21, it automatically conducts more leakage current to the equipment ground whose value often exceeds code standards. Reducing the capacitor value, however, places more RF currents in the circuit access leads creating RFI problems.

Figure 2:
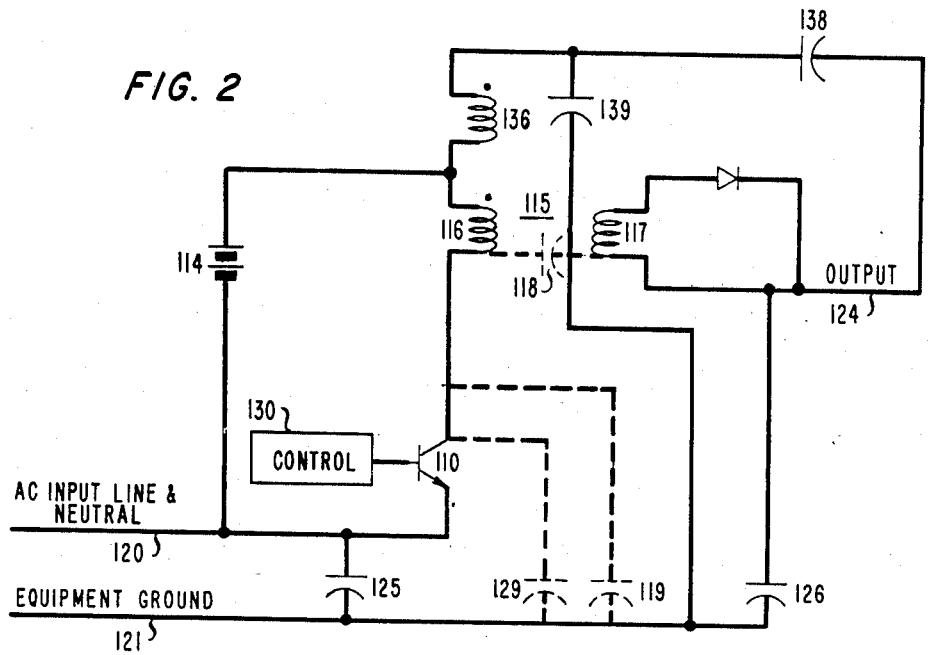
FIG. 2 is a schematic of a high frequency model of a single ended switching type power supply adapted according to the principles of the invention to suppress a source of unwanted RFI.

A particular arrangement for eliminating undesired RF current is shown schematically in FIG. 2 as it is applied to the conceptual schematic model shown in FIG. 1. This particular arrangement utilizes an auxiliary transformer winding 136 and associated added capacitors 138 and 139 to prevent the flow of RF currents out of the equipment ground 121, and into the AC input line and neutral 120 that are due to generated harmonic voltages caused by high frequency switching of the power switching device 110 on the primary side of the circuit.

Added transformer winding 136 is connected in series with primary winding 116 and with the designated winding polarities, as shown. Capacitor 139 is added to couple winding 136 to equipment ground 121. A second capacitor 138 is added to couple the junction of winding 136 and capacitor 139 to the output 124. In order to effectively cancel unwanted RF currents to ground on the primary side, the following relationship should be adhered to:

$$N_1 C_1 = N_2 C_2$$

where $N_1$ represents the number of turns of winding 116,
$N_2$ represents the number of turns of winding 136,
$C_1$ represents the combined paralleled primary to ground and heat sink mounting capacitance to ground as shown by capacitors 119 and 129, and
$C_2$ represents the capacitance of capacitor 139.

In operation the winding 136 operates as a voltage source generating a voltage substantially equal and opposite to the voltages generating the unwanted RF currents. The capacitor 139 combines with the parasitic or stray capacitance 119 to evenly divide the two opposing voltages and neutralize current flow. This neutralizing arrangement is effective within a frequency range in which the voltages of windings 116 and 136 are substantially in phase. The same cancellation arrangement may be extended to cancel any additional unwanted RF currents. The addition of capacitor 138 is added in series to the winding 136 to neutralize current that is coupled by the primary winding to secondary winding stray capacitance 118, and hence allows the output circuitry to float with respect to equipment ground with little RFI current flow to ground. This eliminates the need for a large value bypass capacitor 126 in the output filter circuitry.

Figure 3:
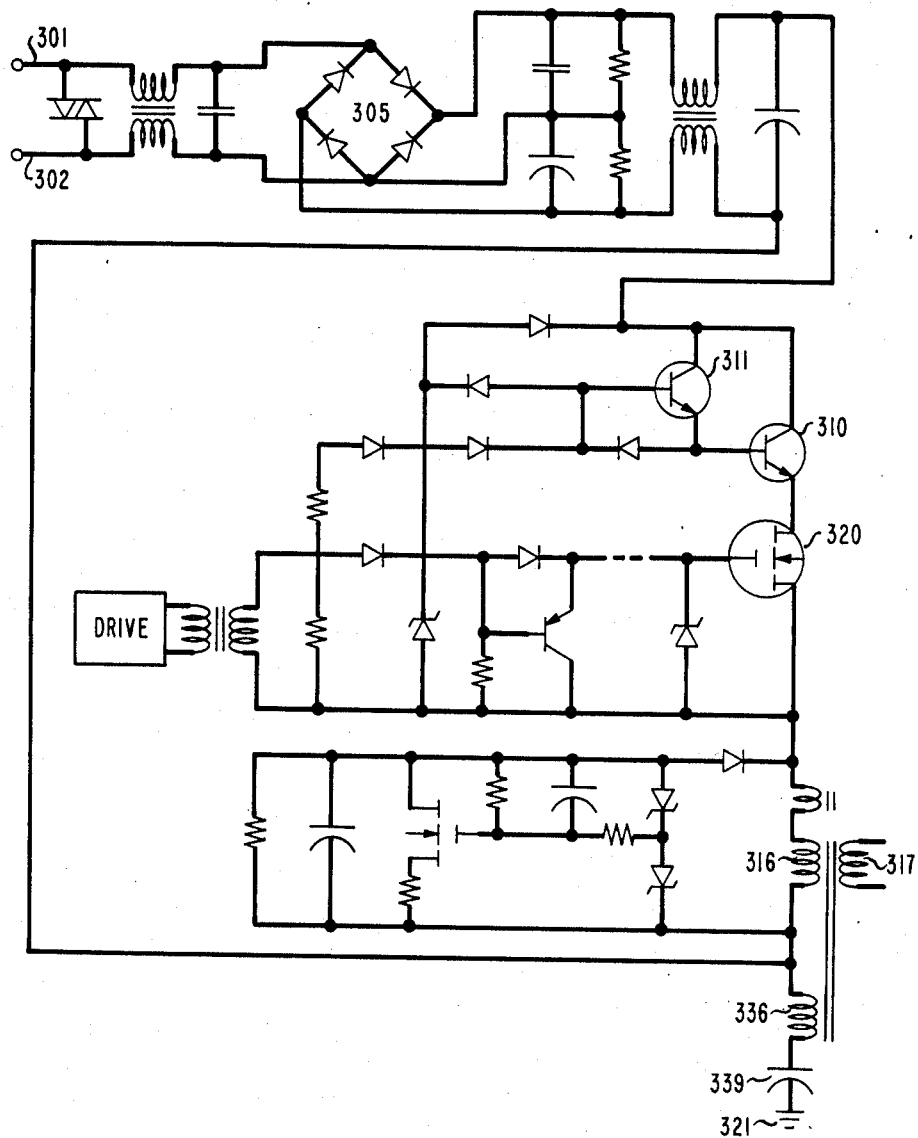
FIG. 3 is a schematic of a single ended switching type power supply designed according to the principles of the invention to cancel RFI currents coupled from the primary winding to ground through a parasitic capacitance.

A power train of an off-line switcher type power supply including circuitry to cancel unwanted RF currents to equipment ground is schematically shown in FIG. 3. An AC line signal applied to input leads 301 and 302 is rectified by fullwave rectifier 305 and coupled through a cascode connected pair of power switches. The first power switch includes a Darlington connected pair of transistors 310 and 311 connected in a common base mode, and the second switch comprises a MOSFET 320 coupled in a common emitter mode and to the primary winding 316 of the power transformer 315. The Darlington connection is driven through a Baker clamp which is well known in the art and need not be disclosed in detail. The drive circuitry for MOSFET 320 is also conventional and believed to need no further description. This combination is adapted to achieve both switching speed and increased power handling capacity. Operation of this power supply is believed to be readily understood by those skilled in the art from the schematic of FIG. 3, and further description is believed unnecessary. Output is derived from the secondary winding 317.

An auxiliary winding 336 is magnetically coupled to and connected in series with the primary winding 316. A capacitor 339 connects winding 336 to equipment ground 321. Winding 336 is oriented so as to generate a voltage of equal magnitude and opposite phase to a voltage across winding 316. The series capacitor 339 stores a voltage to oppose and neutralize a corresponding voltage across the stray capacitance from the primary winding 316 to equipment ground. This auxiliary circuitry operates in connection with the power supply to neutralize the RF currents and prevent their circulating to equipment ground, and additionally reduces the lower frequency leakage currents.

Figure 4:
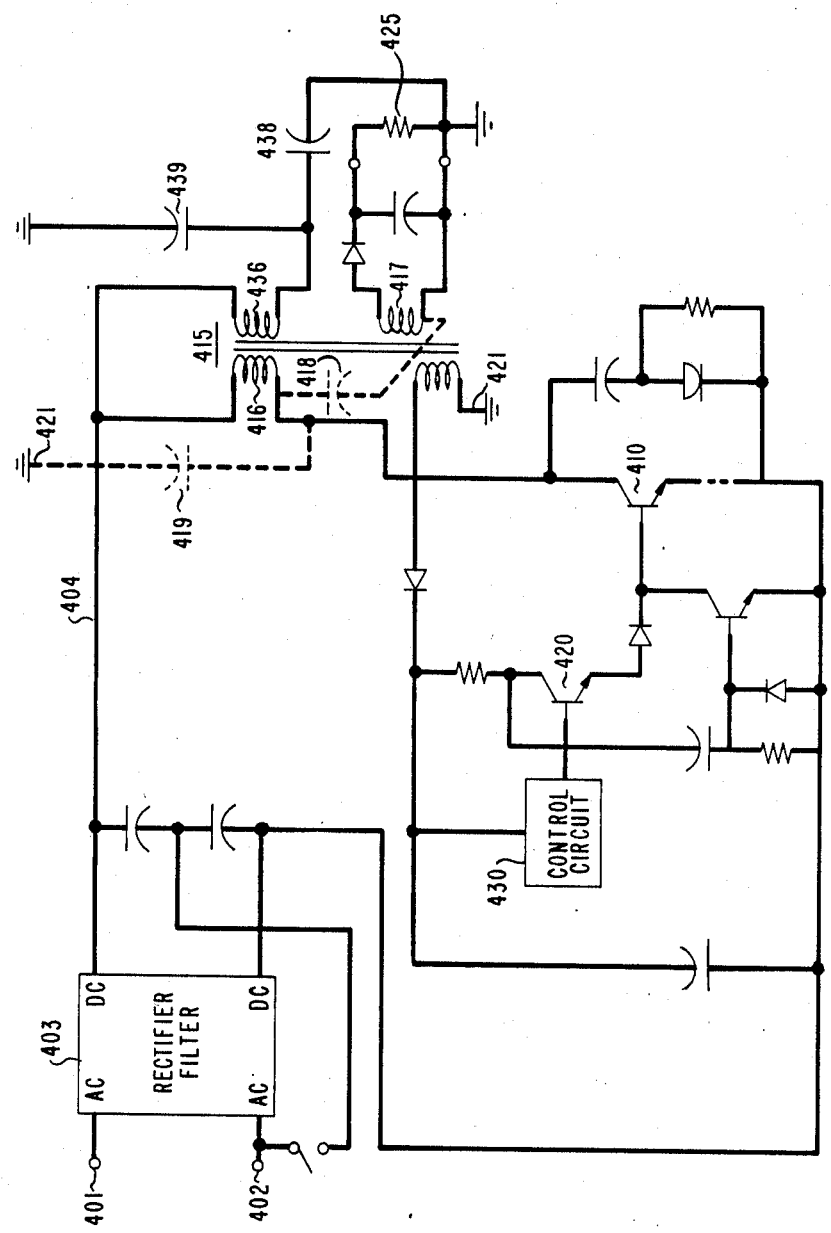
FIG. 4 is a schematic of a single ended switching type power supply including circuitry embodying the principles of the invention to cancel RFI currents on both the primary and secondary sides of a power switching circuit.

Another switching type power supply, as shown in FIG. 4, includes added neutralizing circuitry to neutralize RF currents that flow through a parasitic capacitor 419 from a primary winding and a power transistor mounting to equipment ground 421, and through parasitic capacitor 418 from primary winding 416 to secondary winding 417.

Input power at terminals 401 and 402 is passed through rectifier filter 403 and line 404, through primary winding 416 and power switch 410. The power switch 410 is driven by control circuit 430 via drive transistor 420 to periodically couple primary winding 416 to the input power and enable transfer of power through power transformer 415 to the output load 425.

The switching action of power switch 410 generates high frequency transients which are coupled to equipment ground 421 and to the secondary winding 417 by the stray capacitances 419 and 418, respectively. The currents due to these transients are nullified according to the invention by adding an auxiliary winding 436 to generate an equal but opposite voltage waveform to that generated in winding 416, and the addition of two voltage balancing capacitors 438 and 439 to neutralize the transient responsive ground currents on both primary and secondary sides of the circuit.

Figure 5:
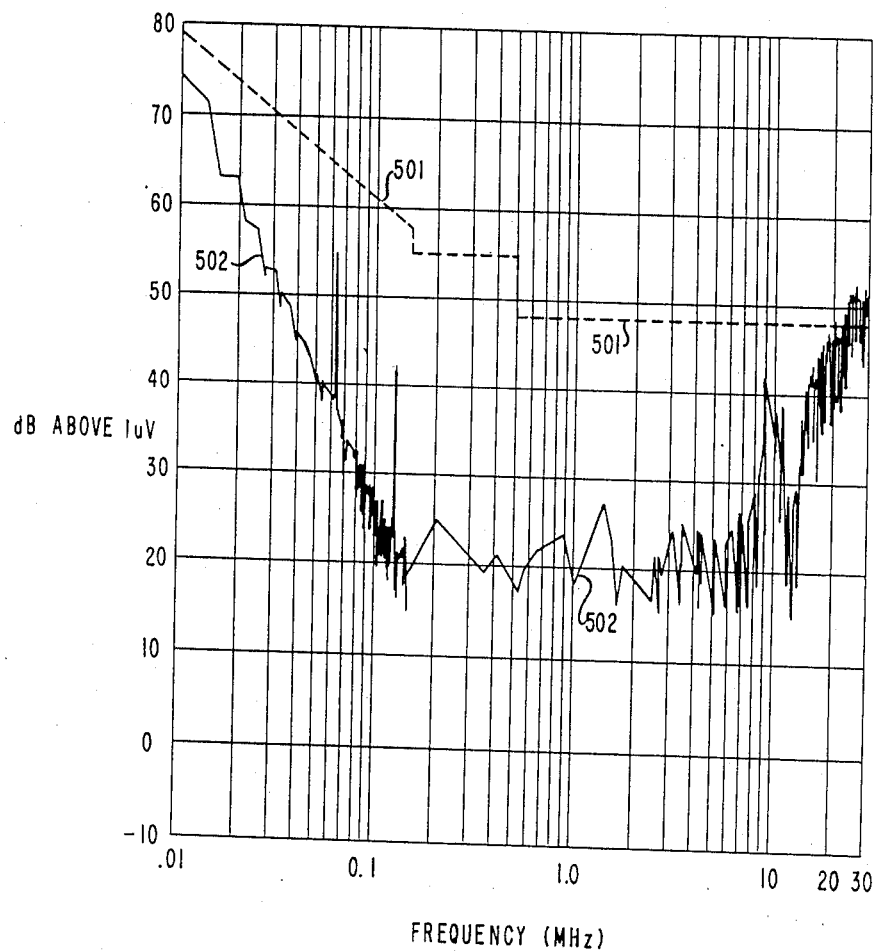
FIG. 5 is a graph of the regulation curves showing permissible RFI emissions compared with measured emissions for the switching type power supply of FIG. 3.

The generated or emitted RFI of the circuit of FIG. 4 is compared to VDE standards in the graph of FIG. 5. The dotted line 501 shows the limits of RFI permitted by the VDE standard, and the amplitude of emitted RFI is shown by the curves 502 at various frequencies. It is apparent that the peak values of RFI over the frequency range of 10 KHz to 1 MHz is substantially below the permitted limit values of line 501. These values are low when compared with the normal expected values even where complicated RFI filtering circuits are utilized.

What is claimed is:

1. A switching type power supply comprising:
   input means for accepting a source of energy,
   a power transformer including at least a first transformer winding,
   a power switch coupling the input means to the first winding,
   an output means coupled to the power transformer,
   a first parasitic capacitance coupling the power switch to an equipment ground and a second parasitic capacitance coupling the first transformer winding to equipment ground,
   means for suppression of current flow in the first and second parasitic capacitances to equipment ground including:
   a voltage source for generating a canceling voltage equal and opposite to a switching transient voltage generating the current flow, and
   a neutralizing capacitance for canceling the current flow through the first and second parasitic capacitances.

2. A switching type power supply as defined in claim 1 wherein the voltage source comprises:
   an auxiliary winding connected in series with the first transformer winding and magnetically coupled to the power transformer, having a winding sense such that a voltage across the auxiliary winding due to flux generated by the first transformer winding is in series opposition to a voltage across the first transformer winding.

3. A switching type power supply as defined in claim 2 wherein the neutralizing capacitance includes at least a first capacitor coupling the auxiliary winding to equipment ground.

4. A switching type power supply as defined in claim 3 wherein a turns ratio between the first transformer winding and the auxiliary winding and a capacitance ratio of the first parasitic capacitance and the first capacitor obeys the relationship:

$$\frac{N_1}{N_2} = \frac{C_{p1}}{C_{n1}}$$

whereby $N_1$ is the number of turns of the first transformer winding, $N_2$ is the number of turns of the auxiliary winding, $C_{p1}$ is the capacitance of the first transformer winding to equipment ground parasitic capacitance, and $C_{n1}$ is the capacitance of the first capacitor.

5. A switching type power supply as defined in claim 4 wherein the neutralizing capacitance further includes a second capacitor coupling a node at which the auxiliary winding and first capacitor are jointly connected to a common lead in the output means, being operative for neutralizing current flow from primary to secondary winding.

6. A switching type power supply as defined in claim 5 wherein the auxiliary winding is closely coupled to the first transformer winding.

7. A switching type power supply comprising:
   an input circuit for accepting a source of energy,
   an output circuit for coupling energy to a load,
   a power transformer having at least a primary and a secondary winding,
   a power switch coupling the input circuit to the primary winding and circuit means coupling the secondary winding to the output circuit,
   an equipment ground reference of a physical mounting of the power supply distinct from earth ground,
   at least a first parasitic capacitance comprising stray capacitance of the primary winding and stray capacitance of a mounting of the power switch and completing an AC current path to equipment ground,
   neutralizing circuitry for counteracting current flow through the first parasitic capacitance to the equipment ground comprising:
   an added winding magnetically coupled to the power transformer and connected in series with the primary winding and oriented to generate a voltage opposing a voltage across the primary winding, and
   a neutralizing capacitor coupling the added winding to equipment ground,
   the neutralizing circuitry governed by the relation:

$$N_1 C_1 = N_2 C_2$$

wherein $N_1$ is a number of turns of the primary winding, $C_1$ is a capacitance of the first parasitic capacitance, $N_2$ is a number of turns of the added winding, and $C_2$ is a capacitance of the neutralizing capacitance.

8. A switching type power supply as defined in claim 7 and further including a second parasitic capacitance coupling the primary winding to the secondary winding, and
   further including a second neutralizing capacitor also coupling the added winding to an output common ground.

9. A switching type power supply as defined in claim 8 wherein the added winding is connected in series with a first one of the neutralizing capacitors.

10. A switching type power supply as defined in claim 9 wherein the second neutralizing capacitor is connected in parallel with a first one of the neutralizing capacitors.

* * * * *